United States Patent Office 3,438,801
Patented Apr. 15, 1969

3,438,801
METHOD OF RENDERING GLASS SURFACES ABRASION-RESISTANT AND GLASS ARTICLES PRODUCED THEREBY
Walter J. Schlientz, Waterville, and Bradley E. Wiens, Toledo, Ohio, assignors to Owens-Illinois Inc., a corporation of Ohio
No Drawing. Filed Jan. 4, 1965, Ser. No. 423,340
Int. Cl. C03c *17/30*
U.S. Cl. 117—88                                          8 Claims

ABSTRACT OF THE DISCLOSURE

Improving abrasion resistance of glass surfaces by coating the glass with a silane of the formula $$(CH_3O)_3SiC_3H_6X,$$

wherein X is a functional group such as an amine, $$CH_2=C(CH_3)COO\text{—}RCOO\text{—}$$

wherein R contains up to 17 carbon atoms, glycidoxy or lecithin, and an acetic acid salt of an alkylamine of the formula $$(RNH_3)^+(CH_3\overset{\overset{\displaystyle O}{\|}}{C}\text{—}O)\text{-}$$

where R is alkyl up to 18 carbon atoms to thereby form a thin, tightly adhering, transparent coating on the glass surface.

---

The present invention relates to the treatment of glass surfaces which are subjected to abrasive contact with each other in the course of handling, filling, and packaging operations and, more particularly, to a method of treating such glass surfaces to improve their resistance to abrasion. This invention further relates to improved abrasion-resistant glass articles produced by the aforesaid method.

Glass derives its strength from an unblemished surface, and any scratches or flaws which are present on its surface considerably decrease its strength, down to as little as one-fourth of its original value. While glass articles such as jars, bottles, tumblers, and the like, have their maximum strength as soon as they are formed, this strength rapidly diminishes as the articles come into contact with each other and with other surfaces, as occurs during the handling, packaging, and shipping of the glassware. This problem is particularly acute in the food- and beverage-processing field wherein the glass containers are subjected to various processing cycles, whereby the bottles are successively filled, closed, and packaged for delivery. Many times the bottles are also subjected to washing, sterilizing, or vacuum treatments, depending upon the particular products with which they are filled.

During each of these operations, the bottles continuously come into contact with each other as they move from station to station and as they are handled by the various apparatus. Breakage of bottles during these operations, particularly after the bottles have been filled, presents additional problems to the processors and adds to the total cost of the operations. To minimize the resulting scratching and abrading of the glass surfaces during the aforesaid operations, numerous attempts have been made in the past to coat the exterior glass surfaces with lubricant compositions. While coating compositions have been used commercially and impart good scratch-resistant properties to glass containers, the properties imparted by some of these compositions are considerably reduced, if not lost altogether, when the treated glass surface is wetted either by water or steam, during the processing cycle. Glass containers for beer, for example, are subjected to a caustic wash prior to being filled, and the glass surfaces, being constantly jostled together as they successively move along the conveyors to the filling, capping, and packaging stations, become scratched and weakened due to the loss of the scratch-resistant properties originally imparted by the coating. Since the product is packaged under pressure, as are carbonated beverages, for example, it is extremely desirable that the surfaces of the containers have as few scratches or abrasions as possible when they ultimately reach the consumer.

It will be appreciated that if the bottles are coated with a composition having good wet and dry scratch-resistant or abrasion-resistant properties, more bottles can be handled by the filling and packaging apparatus in the same amount of time merely by spacing the bottles closer together and increasing the speed of the conveyors. Even though the bottles will be subjected to more contacts with adjoining bottles, the coating will afford sufficient protection so as not to weaken the glass bottles.

Accordingly, it is an object of this invention to provide a method for forming an abrasion-resistant coating on glass surfaces while avoiding the shortcomings of the methods and compositions known and used in the past in attempting to form such abrasion-resistant coatings.

Another object of this invention is to provide a thin, substantially transparent coating on a glass surface, which coating is highly resistant to abrasion, while simultaneously substantially maintaining the strength characteristics of the glass.

Still another object of this invention is to provide a method for coating a glass surface, such as the exterior of a glass container, so as to impart thereto improved dry and wet scratch-resisting properties, thus permitting the container to undergo normal handling, processing, and shipping, with the consequent rubbing of the glass surface with other surfaces, without materially decreasing the strength of the container.

A further object of this invention is to provide an article of manufacture having a glass surface and, on said surface having a tightly adhering, thin, substantially colorless and transparent coating which coating imparts superior scratch-resisting and abrasion-resisting properties to the glass surface.

A further object of this invention is to provide glassware having a thin, substantially colorless and transparent coating on its surface which coating is insoluble in water or caustic solutions, is free from taste and odor, and is nontoxic, so as to permit the ware to be safely used for food and beverages.

In attaining the objects of this invention, one feature resides in applying to a glass surface a solution or dispersion of a compound having the formula $$(CH_3O)_3\text{—}Si\text{—}CH_2CH_2CH_2\text{—}X$$

wherein X is a functional group, and then applying to the coated surface a solution, dispersion, or emulsion of an olefin polymer which can tenaciously bond to the first coating on the glass and produce a glass surface having a hard, scratch-resistant, substantially colorless, transparent coating of 1 micron or less thickness.

Another feature of the invention resides in applying to the silicone-coated surface, in admixture with an alkali metal salt of a fatty acid, an emulsifiable olefin polymer, such as polyethylene wax, polypropylene wax, or similar low molecular weight polymeric olefin waxes.

As another feature of the invention, the silicone-coated glass surface may be coated with a carboxylic acid salt of an alkylamine such as an acetic acid salt of n-alkyl amine wherein the alkyl has up to 18 carbon atoms.

Still another feature of the invention resides in mixing a compound of the formula

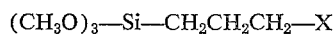

wherein X is a functional group, with an olefin polymer or a carboxylic acid salt of an alkylamine and applying the mixture to a glass surface to form a thin, colorless, transparent, hard coating tenaciously bonded to the glass, which coating has scratching resisting and abrasion-resisting properties far in excess of either ingredient of the mixture alone.

The above and other objects, features, and advantages of the present invention will become apparent to those skilled in the art upon a reading of the following description of the invention.

In carrying out one aspect of the invention, the glass surface of an article of manufacture, such as a bottle, jar, tumbler, sheet glass, and the like, is first heated to a temperature of about 100–170° C. and then sprayed with an aqueous solution or dispersion of a compound of the formula $(CH_3O)_3$—Si—$CH_2CH_2CH_2$—X wherein X is a functional group. Preferably X is a member selected from the group consisting of an amine, $CH_2$=$C(CH_3)COO$—, RCOO— wherein R has up to 17 carbon atoms, glycidoxy, and lecithin.

The glass articles coated with the thin, transparent colorless silicone layer, are then coated with a carboylic acid salt of an alkyl amine or with an olefin polymer while the article is heated, preferably to a temperature of from 100° C. to 170° C.

For purposes of this invention, an aqueous medium containing an olefin polymer of an alkali metal salt of a fatty acid, such as potassium oleate, potassium stearate, and the like may be utilized as the second coating. It is to be understood that when reference is made to alkali metal salts, the ammonium salt is to be included. It has been found that morpholinium stearate will also be satisfactory for the purposes of this invention in lieu of the salts of the fatty acid. When the second coating is dried, the resultant coated article has a scratch-resistance value which is unexpectedly and vastly superior to that of a glass surface having either coating alone.

Furthermore, when the aqueous medium of the second coating composition contains an olefin wax, for example, a low molecular weight polyethylene wax, the wet abrasion-resistance of the coated glass surface is dramatically improved, even after the coated surfaces have been subjected to caustic washes for a period of time.

When the second coating composition contains an alkali metal salt of a fatty acid and a polyethylene wax, in aqueous emulsion, it has been found that excellent results are obtained when this coating composition is that disclosed in U.S. Patent 2,995,533, assigned to the assignee of the present invention, which disclosure is incorporated herein by reference.

The preferred emulsion is prepared by melting 40 parts of partially oxidized low-molecular weight polyethylene having a molecular weight of approximately 1200–2000 and an acid number of 14 to 17, and adding thereto 11 parts of a fatty acid, such as oleic, palmitic, stearic, lauric, or mixtures thereof. Two parts of an aqueous solution of an alkali metal hydroxide are then added to the mixture while the mixture is at a temperature of from 230°–245° F. Water is also added in an amount of 207 parts. The polyethylene has a particle size of less than 10 microns, usually from 1 to 5 microns, and comprises a solids content of about 20% by weight of the emulsion. Additional details on how to make this emulsion are to be found in the specification of the aforesaid U.S. Patent 2,995,533. A preferred composition has the following proportions in approximate parts by weight:

| | Parts |
|---|---|
| AC Polyethylene No. 629 | 40 |
| Oleic acid (U.S.P.) | 11 |
| Potassium hydroxide | 2 |
| Distilled water | 207 |

The aforesaid polyethylene is distributed by Allied Chemical and Dye Corporation. The above emulsion is then diluted with up to about 200 parts water by volume and sprayed directly onto the glass surface previously coated with the aforesaid silane.

Preferred among the carboxylic acid salts of alkylamines are the acetic acid salts of the n-alkylamines having the formula $(RNH_3)^+(CH_3COO)^-$ wherein R is an alkyl having up to 18 carbon atoms and preferably from 8 to 18 carbon atoms. Alternatively the alkylamine may be a mixture of these acetic acid salts wherein the alkyl group R is that normally found in coconut and tallow fatty acids. For example, a mixture wherein R is hexadecyl, octodecyl and octodecenyl (monounsaturated) has been found to be excellent for the purpose of the invention. A specific example of such mixture is where R is 25% hexadecyl, 72% octodecyl and 3% octodecenyl. These salts are applied from an aqueous emulsion and are present therein from 0.2 to about 1% by weight.

The following examples are merely illustrative of the present invention and should not be considered limiting its scope in any way.

Solutions of several silanes of the formula

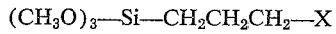

were prepared by adding 1 part by volume of silane to 199 parts by volume of deionized water. The solution of the silane wherein X is lecithin was prepared by adding 2 parts by volume of the silane to 8 parts by volume tetrahydrofuran and then adding to 190 parts water to form an emulsion.

Glass bottles which had been heated for 15 minutes in an oven maintained at a temperature of 150° C. were then sprayed while hot with one of the 0.5% silane solutions or emulsion, using a De Vilbiss EGA spray gun. A thin, colorless, transparent coating was formed on each of the bottle surfaces. These bottles were tested for scratch resistance and the results are set forth in Table I, infra.

Additional bottles coated with the silane in the manner set forth above were further coated with an aqueous emulsion containing 0.15% by weight polyethylene wax (AC-629) and 0.05% potassium oleate while the temperature of the bottle surfaces was about 140° C. A thin, hard, colorless, transparent, coating was formed which tenaciously adhered to the first coating.

Additional bottles, also having been coated with the silane as indicated above were then sprayed with an aqueous medium containing 0.5% by weight tallow amine acetate (Armac HT made and sold by Armour Industrial Chemical Co.) of the formula

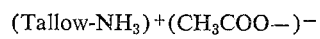

A De Vilbiss EGA spray gun was used in applying the aforesaid overcoats to the silane coated bottles.

All bottles treated in accordance with the foregoing were tested with a scratch test machine to evaluate the effectiveness of the respective coatings. The machine is designed to abrade the surface of one glass bottle against the surface of a similar bottle and is fully described and illustrated in pending application Ser. No. 355,252 filed Mar. 27, 1964, and assigned to the present assignee. Thus, a bottle is fastened securely in a stationary low set of chucks, while a second bottle is fastened in a set of upper chucks which are positioned so that the axes of the bottles are at 90° relative to each other. A test load is applied to the upper bottle while it is being driven at a constant speed of 2.8 inches per minute in a direction 45° to the axis of each bottle. The actual rate of scratch propagation on the bottles is then 2 inches per minute.

Using the test apparatus of the drawing, a fresh surface of one bottle is always contacted with a fresh surface of the other bottle. Since the base of each bottle extends in the direction of motion, the scratch is propagated from the shoulder portion toward the base. This permits the detection of poor scratch protection in a particular section of the ware, since identical sections of each bottle are contacted.

The force exerted by the second bottle is a known, measured force and, after each pass, the bottles are examined for scratches. The force, or load, in pounds was measured with respect to the scratch-resistance of the dry bottles and of bottles which were wetted with water, i.e., measured while the contacting surfaces in the above test machine were submerged in water. The results are set forth below and are compared with an uncoated bottle:

TABLE

| Example | Number of pounds to produce scratch | | | | |
|---|---|---|---|---|---|
| | Undercoat only | Overcoat | | | |
| | | Polyethylene wax | | Tallow amine acetate | |
| | | Dry | Wet | Dry | Wet |
| (1) Uncoated | 2 | 20 | 9.5 | 10 | 5 |
| Coated with $(CH_3O)_3SiC_3H_6X$ wherein X is— | | | | | |
| (2) N-beta-aminoethyl-gamma-aminopropyl (Z-6020) | 5 | 70 | -------- | 20 | 40 |
| (3) Stearyl (Z-4141) | 30 | 70 | 85 | 55 | 55 |
| (4) $CH_2=C(CH_3)COO$— (Z-6030) | 5 | 70 | 70 | 50 | 55 |
| (5) Glycidoxy (Z-6040) | 30 | 85 | 100+ | 85 | 100 |
| (6) Lecithin (XZ-80956) | 55 | 100 | -------- | 100 | 100 |

The designations within the parentheses are those used by Dow Corning Corporation for the particular silanes. The "+" after the numeral 100 in the above table indicates that no scratch had developed with that load and the test was not carried any further.

From the above table, the unexpected and synergistic results obtained by the process of the present invention over the silane coatings per se are readily demonstrated. Since almost all food containers are subjected to a plurality of operations including washing, pasteurization, sterilization, and the like, the risk of scratching or abrading the bottles is particularly acute at such times, and it is precisely at such times that the coating of the present invention affords the most protection to the glass surfaces.

It has been further found that the two coating ingredients may be mixed and applied in a single step. A stable emulsion was made by heating 4 ml. of $(CH_3O)_3SiC_3H_6COO$-stearyl, 1 gm. of tallow amine acetate and 16 ml. ethyl alcohol until all of the ingredients dissolved and the mixture was poured into 179 ml. of water. The emulsion was sprayed onto the surface of glass bottles which had been heated to 140° C. and a fine, invisible coating formed thereon. Rubbing two bottles hard together produced no scratches on the surface. Testing the coated bottles on the testing machine described above resulted in a scratch on the surface being formed with a load of 100 lbs. on the dry surfaces and 85 lbs. on the wet surfaces.

Having thus fully described the invention, what is claimed is:

1. A method for increasing the abrasion resistance of a glass surface comprsing applying to said surface a compound of the formula $(CH_3O)_3SiC_3H_6X$, wherein X is a functional group selected from the group consisting of an amine, $CH_2=C(CH_3)COO$—, RCOO— wherein R has up to 17 carbon atoms, glycidoxy and lecithin, said compound being applied in an amount sufficient to form a thin, colorless, transparent coating on said surface and then applying thereto an acetic acid salt of an alkylamine having the formula

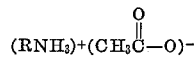

wherein R is an alkyl group having up to 18 carbon atoms, in an amount sufficient to form a thin, tightly adhering, transparent coating on said surface.

2. The method as defined in claim 1 wherein said acetic acid salt of an alkylamine consists of a mixture of acetic acid salts having the formula

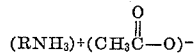

wherein R is the alkyl portion of a member selected from the group consisting of tallow and coconut fatty acids.

3. The method as defined in claim 1 wherein said acetic acid salt of any alkylamine consists of a mixture of such salts having the formula

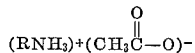

wherein 25% of the mixture consists of the salt having R as being hexadecyl, 72% of the mixture consists of the salt having R as being octadecyl, and the remainder of the mixture has R as being octadecenyl.

4. The method as defined in claim 3 wherein said mixture of said salts is present as from about 0.2 to about 0.5% solids in an aqueous emulsion.

5. An article of manufacture having a glass surface which has been made abrasion-resistant by having a thin, tightly adhering, transparent coating formed thereon in accordance with the process of claim 1.

6. The article as defined in claim 5 wherein said coating has a thickness of less than 1 micron.

7. A method for increasing the abrasion-resistance of a glass surface comprising maintaining said surface at a temperature of from 100–170° C. while applying thereto an aqueous solution of trimethoxy stearyl propyl silane and then applying to said coated surface while at a temperature of from 100–170° C. an aqueous emulsion of tallow amine acetate.

8. A method for increasing the abrasion-resistance of a glass surface comprising maintaining said surface at a temperature of from 100–170° C. while applying thereto an aqueous dispersion of trimethoxy lecithin propyl silane, and then applying to said coated surface while at a temperature of from 100–170° C. an aqueous emulsion of tallow amine acetate.

References Cited

UNITED STATES PATENTS

| | | | |
|---|---|---|---|
| 2,965,596 | 12/1960 | Sharf | 260—29.6 XR |
| 2,995,533 | 8/1961 | Parmer et al. | 260—23 XR |
| 3,075,948 | 1/1963 | Santelli | 260—45.5 XR |
| 3,161,536 | 12/1964 | Dettre et al. | 117—69 XR |
| 3,161,537 | 12/1964 | Dettre et al. | 117—69 XR |
| 3,177,170 | 4/1965 | Lund | 260—29.2 XR |
| 3,285,802 | 11/1966 | Smith et al. | 161—185 |
| 3,318,757 | 5/1967 | Atwell | 161—193 |
| 3,323,889 | 6/1967 | Carl et al. | 65—60 XR |

ALFRED L. LEAVITT, *Primary Examiner.*

W. F. CYRON, *Assistant Examiner.*

U.S. Cl. X.R.

117—69, 124